March 18, 1958  S. H. NORTON  2,827,029
VALVE ROTATING DEVICE

Filed Sept. 29, 1955  2 Sheets-Sheet 1

Inventor
Samuel H. Norton

March 18, 1958  S. H. NORTON  2,827,029
VALVE ROTATING DEVICE
Filed Sept. 29, 1955  2 Sheets-Sheet 2
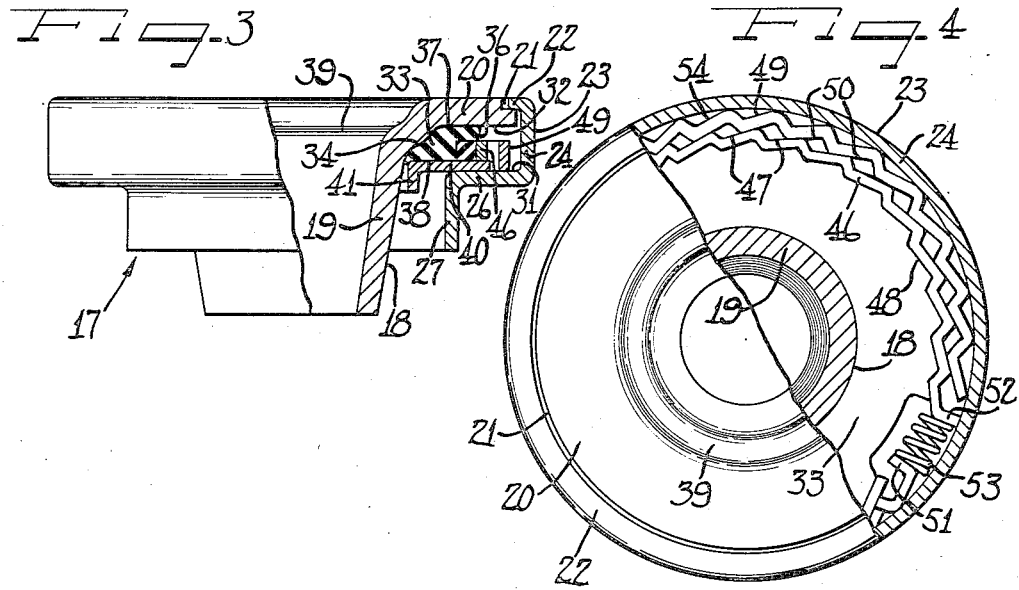
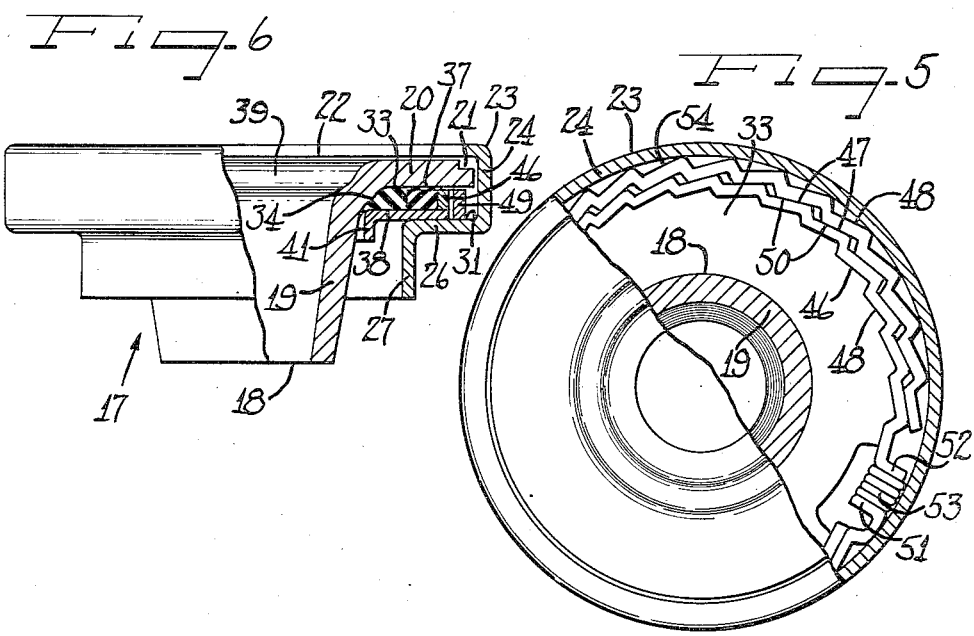
Inventor
Samuel H. Norton
by Hill, Sherman, Meroni, Gross & Simpson

United States Patent Office 2,827,029
Patented Mar. 18, 1958

2,827,029

VALVE ROTATING DEVICE

Samuel Harry Norton, University Heights, Ohio, assignor to Thompson Products, Inc., Cleveland, Ohio, a corporation of Ohio Application September 29, 1955, Serial No. 537,356

12 Claims. (Cl. 123—90)

This invention relates generally to a device for rotating two axially adjacent parts in response to varying axial loads. More particularly, this invention relates to an apparatus and a method of rotating two axially adjacent relatively rotatable parts which includes means for practicing the steps of cyclically loading and unloading the parts with axially directed forces and transmitting load between the parts through a deformable non-compressible load-transmitting means without appreciable deformation at minimum load but with a discrete radially directed linear translation of portions of the load-transmitting means in response to greater than minimum load, which linear translation is converted into a driving torque acting between the parts, thereby to rotatably drive the parts with respect to one another.

Although the principles of the present invention are of general utility, a particularly useful application is found in connection with the provision of valve-rotating devices. It is highly desirable to provide means for rotating engine valves since cyclic rotation of the valves during the course of operation thereof assists in eliminating valve burning as well as wearing, pitting and stem-galling and scoring.

It is an object of the present invention to provide a valve-rotating device which uses as a load-transmitting means a deformable non-compressible medium.

Another object of the present invention is to provide rotating means wherein linear translation of a deformable non-compressible means is converted into rotary movement.

Yet another object of the present invention is to provide a valve rotator using rubber as a medium for actuating the device.

A still further object of the present invention is to provide a valve rotator made up of a minimum number of parts which are inexpensive to make.

A further object of the present invention is to provide a positive-type valve rotator which will take up less space whether installed on top of the valve spring or below the valve spring.

Many other features, advantages and additional objects of the present invention will become manifest to those versed in the art upon making reference to the detailed description which follows and the accompanying sheets of drawings in which a preferred structural embodiment of a valve-rotating device is shown by way of illustrative example.

On the drawings:

Figure 3 is a fragmentary elevational view of the valve-rotating device of the present invention with parts broken away to show additional details of structure and illustrating the components of the valve-rotating device in a minimum load condition;

Figure 4 is a plan elevational view somewhat enlarged of the valve-rotating device shown in Figure 3 and with parts broken away to show additional details of construction;

Figure 5 is a view similar to Figure 4 but showing the components of the device repositioned as when the valve-rotating device is under increased load;

Figure 6 is a view similar to Figure 3 but showing the components of the valve-rotating device repositioned in accordance with the load condition illustrated in Figure 5.

As shown on the drawings:

Figures 1, 2:
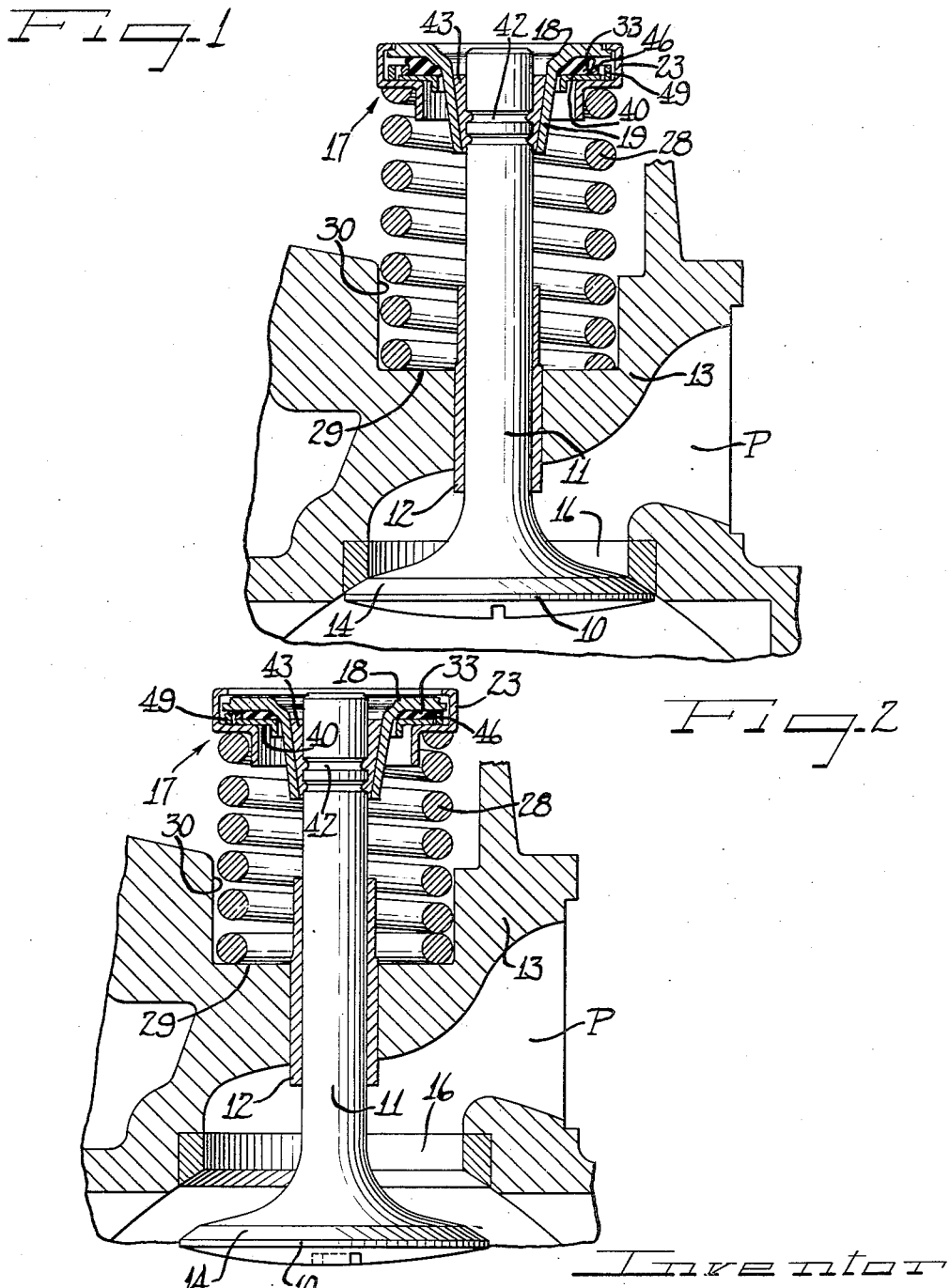
Figure 1 is a cross-sectional view with parts shown in elevation illustrating a valve assembly of an internal combustion engine and incorporating a valve-rotating device provided in accordance with the principles of the present invention, the valve being shown in a minimum load condition wherein the valve head is closed on a valve seat.
Figure 2 is a view similar to Figure 1 but showing the components of the assembly repositioned when the valve is loaded to an open position.

Although the principles of the present invention are of general utility, the preferred illustrative embodiment herein described relates to a valve-rotating device for the stemmed valve 10 having a stem 11 reciprocable in a stem guide 12 carried in an engine part 13. The valve 10 has a beveled head providing a beveled seating surface 14 engaging and seating against a correspondingly beveled seating surface of a valve insert ring 16 carried by the engine part 13 at an opening forming a portion of a port P controlled by the valve 10.

Although a valve-rotating device incorporating the principles of the present invention could be installed at either the top of the valve spring or below the valve spring, the illustrative embodiment herein described shows a valve-rotating device indicated generally at 17 at the top of the valve spring.

The valve-rotating device 17 includes a valve cap 18 which comprises a generally cylindrical member having tapered side walls 19 flanged at one end to provide a flange 20.

The flange 20 is notched as at 21 to receive a staked-over flange 22 formed on a valve spring collar member 23. The valve spring collar member 23 has an axially extending wall 24 spaced concentrically outwardly of the tapered walls 19 on the valve cap 18. There is further provided a radially inwardly extending flange 26 terminating at its inner end in a downwardly turned axially extending wall 27.

A helically wound coil forming a valve spring 28 is bottomed against the flange 26 of the valve spring collar 23. The wall 27 pilots inside of the coils of the valve spring 28. The opposite end of the valve spring 28 bottoms against a wall 29 formed on the engine part 13 at the bottom of a recess 30.

As shown on the drawings, the flange 26 has a wall surface 31 which is spaced axially from a wall surface 32 formed on the flange 20. Both of the wall surfaces 31 and 32 extend generally radially with respect to the axis of the valve 10 and are spaced apart from one another a sufficient distance to leave a recess area.

Confined within the recess area is an annular rubber ring indicated at 33. Although rubber is illustrated herein as an exemplary material, it should be understood that it is contemplated, according to the present invention, to provide a ring 33 made of any suitable deformable non-compressible material. Rubber has favorable characteristics since it is elastically deformable and good rubber compositions can be provided which are heat-resistant and durable in operation.

The ring 33 is preferably of a generally rectangular shape in cross-section, being provided with an inner peripheral wall 34, an outer peripheral wall 36, and spaced end walls 37 and 38, respectively.

In the present embodiment, the inner peripheral wall 34 snugly engages the tapered side walls 19 of the valve cap 18 and conforms in shape to any irregularities such as the slight embossment 39 illustrated in the preferred embodiment of the present disclosure. The end wall 37 engages against the wall surface 32 formed on the flange 20 of the valve cap 18.

A bearing piece 40 comprising an annular flat ring flanged as at 41 abuts against the end wall 38 of the ring 33 and slidably relates the ring 33 to the wall surface 31 formed on the flange 26 of the valve spring collar 23. The bearing piece 40 also serves to further confine the ring 33 between the axially spaced wall surfaces 31 and 32 and relates the ring 33 to the valve rotating device 17 in such a manner that minimum load, as occurs in the closed valve position of Figure 1, will be transmitted between the valve spring collar 23 and the valve cap 18 through the rubber ring 33.

In this connection, it will be noted that the valve cap 18 is connected in firm assembly to the stem 11 of the valve 10. The stem 11 has locking grooves 42 formed therein cooperating with valve cap retainer means 43 tapered to engage the taper side walls 19 of the valve cap 18.

It will be appreciated, therefore, that the valve 10 together with the cap 18 and the ring 33 with its bearing piece 40 constitutes a rotatable inner part with respect to a stationary outer part formed by the valve spring collar 23, the valve spring 28 and the engine part 13.

Since the rubber ring 33 is confined by the bearing piece 40 and the valve cap 18 as well as the valve spring collar 23, the ring 33 will attain an equilibrium condition of compression and thickness when it transmits minimum spring load between the parts. When the ring 33 is subjected to additional compression, however, such as occurs when increased spring loading results from a movement of the valve to a valve open position, as shown in Figure 2, the deformable non-compressible substance tends to linearly displace the outer peripheral wall portions 36 in a radially outward direction. This linear movement of translation is converted, in accordance with the principles of the present invention, to a rotary movement operable to apply a torque between the inner and outer parts, thereby rotatably driving the parts.

In order to attain that objective, suitable actuating means are interposed between the ring 33 movable with the inner part and the relatively stationary outer part.

First of all, there is provided a split ring member 46 crimped to provide a plurality of circumferentially spaced teeth each particularly characterized by generally tangentially disposed action surfaces indicated at 47.

The inner surface of the ring 46 is indicated at 48 and it will be noted that this inner surface 48 is in tight contact with the rubber ring 33.

Between the split ring 46 and the wall 24 of the valve spring collar 23, there is provided a second annular split ring 49 having a plurality of circumferentially spaced teeth each providing opposed confronting relatively slidable action surfaces 50 cooperating with the action surfaces 47 on the split ring 46.

One end of the split ring 49 is flanged as at 51 and the opposed end of the split ring 46 is flanged as at 52. Between the flanges 51 and 52, there is provided a coiled compression spring 53 which operates as a continuous biasing means tending to rotate the split rings 46 and 49 relative to each other until the high points of the teeth on one ring are in close contact with the corresponding high points on the teeth of the other ring, as shown in Figure 4.

It will be appreciated that the rings 46 and 49 can be conveniently made as crimped pieces, thus providing the intermeshing teeth having the angularly inclined action surfaces.

When the valve-rotating device 17 is subjected to increased axial load, as when the valve 10 is opened, the rubber ring 33 will be expanded radially outwardly whereupon the ring 46 will be pressed with a great deal of force against the adjoining split ring 49. Since neither of the rings 46 and 49 are continuous circles but are split, the rings are permitted to expand freely. As the rubber ring 33 is compressed, the split rings 46 and 49 operate as ratchet pieces and since the inner ring 46 can assume a greater diameter only by rotating, the teeth on the inner ring 46 will assume a lower level relative to the teeth on the outer ring 49. The outer ring 49 has an outer surface 54 pressed tightly against the wall 24 of the spring collar 23 which is the relatively stationary part of the assembly. Thus, the rubber ring 53 and the valve cap 18 will turn with the ratchet part or inner ring 46 thereby rotatably driving the valve 10.

When the teeth on the inner ring 46 slide down on the teeth of the outer ring 49 because of the relative sliding movement between the action surfaces 47 and 50, and each of the inner and outer rings 46 and 49 turn relative to each other, the coil spring 53 will be compressed, as shown in Figure 5, the other components of the valve-rotating assembly being moved to the position of Figure 6.

When the valve 10 closes and the valve spring 28 expands, the pressure on the rubber ring 33 decreases and permits the rubber ring 33 to expand laterally and contract radially. The resulting motion of the outer peripheral wall 36 on the rubber ring 33 relieves the pressure against the ratchet part or split inner ring 46 whereupon the ring 46 will contract and relieve the pressure on the ratchet teeth, and specifically the action surfaces 47 and 50. As this pressure is relieved, the coil spring 53 will force the outer ring 49 to rotate between the wall 24 of the valve spring collar 23 and the inner ring 46 until the outer ring 49 is once again tight between the wall 24 and the high points on the ratchet teeth of the inner ring 46. The component parts of the valve-rotating device 17 are then ready for another cycle.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. In combination, two axially loaded parts, elastically deformable non-compressible load-transmitting means between said parts and confined to move radially outwardly upon increased axial load, and means forming tangentially disposed angularly inclined oppositely confronting relatively slidable action surfaces operatively interposed between said parts to rotatably drive said parts upon actuation by said load-transmitting means.

2. In combination, two axially loaded relatively rotatable parts, radially movable load-transmitting means responsive to increased axial load between said parts, and means forming tangentially disposed angularly inclined oppositely confronting relatively slidable action surfaces operatively interposed between said parts to rotatably drive said parts upon actuation by said load-transmitting means.

3. The method of rotating two axially adjacent relatively rotatable parts which includes the steps of cyclically loading and unloading the parts with axially directed forces, transmitting axial load between the parts through a load-transmitting member, temporarily deformably compressing said load-transmitting member to produce a discrete radially-directed linear translation of portions of said member in response to greater than minimum loads, and converting said linear translation into a torque between said parts to rotatably drive the parts with respect to one another.

4. The use of a deformable non-compressible load-transmitting means in a rotating device which includes the steps of transmitting axially directed minimum loads between two relatively rotatable coaxially disposed parts through the load transmitting means, confining the load-transmitting means to produce linear movement of translation in response to greater than minimum axial load, and converting the linear movement of translation into a torque applied to the two parts to rotatably drive the parts.

5. In combination, two relatively rotatable coaxially disposed parts, a deformable non-compressible load-transmitting means confined between said parts to transmit minimum axially directed loads without appreciable deformation but deforming in response to greater than minimum load to move portions of said load-transmitting means linearly, and conversion means between the parts and actuated by said movable portions of said load-transmitting means to convert said linear movement into a torque applied between said parts to rotatably drive the parts.

6. In combination, inner and outer coaxial rotatable parts providing axially spaced confronting radial abutment surfaces, an elastically deformable annular ring of non-compressible material having one peripheral wall engaging one of said members, said ring having axially spaced end walls engaging said abutment surfaces of said members, said ring having a second peripheral wall concentrically spaced from said one peripheral wall and translatable linearly in response to greater than minimum load between said parts, and means forming a plurality of tangentially disposed confronting relatively slidable angularly inclined action surfaces between said second wall and said adjoining wall of one of said parts, said one part having a slidable connection with said ring at said abutment surface to release said parts for relative rotation whenever the movement of said wall is converted to a torque between said parts by said action surfaces.

7. A valve rotating device comprising, a valve cap, and a valve spring collar forming inner and outer coaxial rotatable parts providing axially spaced confronting radial abutment surfaces, an elastically deformable annular ring of non-compressible material having one peripheral wall engaging one of said parts, said ring having axially spaced end walls engaging said abutment surfaces of said parts, said ring having a second peripheral wall concentrically spaced from said one peripheral wall and translatable linearly in response to greater than minimum load between said parts, means forming a plurality of tangentially disposed confronting relatively slidable angularly inclined action surfaces between said second wall and an adjoining wall of one of said parts, said one part having a slidable connection with said ring at said abutment surface to release said parts for relative rotation whenever the movement of said second wall is converted to a torque between said parts by said action surfaces, a valve connected to said valve cap, and a valve spring bottomed against said valve spring collar to load said valve closed, said valve being incrementally rotated each time said spring is compressed upon opening of said valve.

8. A valve rotating device comprising, a stemmed valve having a valve cap connected thereto, said valve cap having a first radially outwardly extending wall and a second axially extending annular wall formed thereon, a valve spring collar having a third axially extending wall spaced concentrically outwardly of said second axially extending wall on said valve cap, and an inwardly extending flange forming a fourth wall spaced axially of said first wall, a valve spring bottomed against one side of said flange, an annular rubber ring on the other side of said flange having inner and outer peripheral walls and axially spaced end walls, one of said end walls and one of said inner and outer walls of said ring engaging one of the relatively rotatable first and fourth walls provided by said valve cap and said valve spring collar, respectively, the other of said end walls of said ring being slidably connected to the other of said first and fourth walls, and means forming a plurality of slidable angularly inclined action surfaces between one of said inner and outer peripheral walls of said ring and an adjoining one of said second and third walls to rotatably drive the valve incrementally.

9. A valve rotating device comprising a stemmed valve having a valve cap connected thereto, said valve cap having a first radially outwardly extending wall and a second axially extending annular wall formed thereon, a valve spring collar having a peripheral axially extending wall spaced concentrically outwardly of said second annular wall and an inwardly extending flange spaced axially of said first wall, a valve spring bottomed against one side of said flange, an annular rubber ring on the other side of said flange, said ring having axially spaced end walls and inner and outer peripheral walls, said inner peripheral wall engaging said second wall, one of said end walls engaging said first wall, the other of said end walls having means slidably engaging said flange, said outer peripheral wall being movable radially in response to increased axial load on said rubber ring, a first split ring member connected to said outer peripheral wall and movable thereby, a second split ring member between said collar wall and said first ring, both of said ring members having confronting intermeshing teeth providing angularly inclined action surfaces relatively slidable with respect to one another, and continuous biasing means between opposed ends of said first and second split ring members to normally mate the highest portions of said action surface, said outer peripheral wall forcing said first split ring member outwardly against said second split ring member to shift the action surfaces and rotatably drive the valve incrementally.

10. In combination, two axially loaded relatively rotatable coaxial parts, an elastically deformable non-compressible ring between said parts and transmitting minimum axial load therebetween without appreciable deformation, said ring having an axially extending radial wall movable radially upon deformation of said ring in response to increased axial load, and motion converting means actuated by the radial movement of said wall operatively connected between said parts to rotatably drive the parts with respect to one another in response to increased axial load.

11. In combination, two axially adjacent relatively rotatable parts, load-transmitting means for transmitting axial load between the parts, said load-transmitting means being constructed and arranged to produce a discrete radially directed linear translation in response to greater than minimum loads, and means for converting said linear translation into a torque between said parts to rotatably drive the parts with respect to one another.

12. In combination, two axially adjacent relatively rotatable parts, a deformable non-compressible load-transmitting means transmitting axial load between the parts without appreciable deformation at minimum load, said load-transmitting means producing a discrete radially directed linear translation in response to greater than minimum loads, and means for converting said linear translation into a torque between said parts to rotatably drive the parts with respect to one another.

References Cited in the file of this patent

UNITED STATES PATENTS

| | | |
|---|---|---|
| 2,516,795 | Norton | July 25, 1950 |
| 2,589,418 | Mitzelfeld et al. | Apr. 18, 1952 |